(12) United States Patent
Kitsukawa et al.

(10) Patent No.: US 11,415,663 B2
(45) Date of Patent: Aug. 16, 2022

(54) RADAR DEVICE

(71) Applicant: Mitsubishi Electric Corporation, Tokyo (JP)

(72) Inventors: Yusuke Kitsukawa, Tokyo (JP); Toru Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 347 days.

(21) Appl. No.: 16/608,548

(22) PCT Filed: Jun. 8, 2017

(86) PCT No.: PCT/JP2017/021307
§ 371 (c)(1),
(2) Date: Oct. 25, 2019

(87) PCT Pub. No.: WO2018/225211
PCT Pub. Date: Dec. 13, 2018

(65) Prior Publication Data
US 2021/0096211 A1    Apr. 1, 2021

(51) Int. Cl.
*G01S 13/28* (2006.01)
*G01S 7/32* (2006.01)
(Continued)

(52) U.S. Cl.
CPC ............. *G01S 7/32* (2013.01); *G01S 7/282* (2013.01); *G01S 7/2883* (2021.05); *G01S 13/28* (2013.01);
(Continued)

(58) Field of Classification Search
CPC .......... G01S 13/28; G01S 19/35; G01S 19/36; G01S 19/37; G01S 7/282; G01S 7/285; G01S 7/2883; G01S 7/32
See application file for complete search history.

(56) References Cited

U.S. PATENT DOCUMENTS

2015/0355322 A1* 12/2015 Oshima .................. G01S 13/46
                                                              342/116
2017/0269195 A1*  9/2017 Cottron .................... G01S 7/32

FOREIGN PATENT DOCUMENTS

JP      2005-85167 A      3/2005
JP      2005085167 A  *   3/2005
(Continued)

OTHER PUBLICATIONS

International Search Report (PCT/ISA/210) issued in PCT/JP2017/021307, dated Sep. 5, 2017.
(Continued)

*Primary Examiner* — Timothy A Brainard
(74) *Attorney, Agent, or Firm* — Birch, Stewart, Kolasch & Birch, LLP.

(57) ABSTRACT

The transmission unit generates a transmission signal obtained by multiplying a linearly FM-modulated pulse signal by a first window function. The pulse compression unit divides a signal, which is obtained by multiplying a first reference signal obtained by multiplying the pulse signal by a second window function different from the first window function, by a complex conjugate part of a second reference signal obtained by multiplying the pulse signal by a third window function, which is a function independent of the second window function, by a complex conjugate part of the transmission signal, and uses this as a reference signal. Then, the pulse compression unit performs pulse compression on the received signal using the reference signal.

3 Claims, 4 Drawing Sheets

(51) Int. Cl.
    *G01S 7/282*    (2006.01)
    *G01S 19/37*    (2010.01)
    *G01S 19/35*    (2010.01)
    *G01S 19/36*    (2010.01)
    *G01S 7/288*    (2006.01)

(52) U.S. Cl.
    CPC .............. *G01S 19/35* (2013.01); *G01S 19/36* (2013.01); *G01S 19/37* (2013.01)

(56) References Cited

FOREIGN PATENT DOCUMENTS

| JP | 2008-175552 A | 7/2008 |
| JP | 4421487 B2 | 2/2010 |
| JP | 2011-247615 A | 12/2011 |
| JP | 5369350 B2 | 12/2013 |
| JP | 2014-115095 A | 6/2014 |
| JP | 5607424 B2 | 10/2014 |
| JP | 2016-156732 A | 9/2016 |
| JP | 2016156732 A * | 9/2016 |

OTHER PUBLICATIONS

Japanese Office Action issued in Application No. 2017-556265, dated Dec. 19, 2017.

* cited by examiner

RADAR DEVICE

TECHNICAL FIELD

The present invention relates to a radar device which performs pulse compression of a received signal by obtaining a correlation between a transmission signal multiplied by a window function, the received signal, and a reference signal.

BACKGROUND ART

As a conventional radar device that performs pulse compression, there is a radar device described in Patent Literature 1, for example. This radar device performs pulse compression using a signal generated on the basis of the autocorrelation of a desired signal multiplied by a window function.

CITATION LIST

Patent Literatures

Patent Literature 1: JP 2011-247615 A

SUMMARY OF INVENTION

Technical Problem

However, in the radar device described in Patent Literature 1, the transmission signal is not multiplied by the window function, so there is a problem that the unwanted wave level in the vicinity of the transmission signal becomes large in the frequency spectrum of the transmission signal. In addition, there is a problem that the signal after pulse compression is limited to the characteristics of distance resolution and range side lobe obtained from the autocorrelation signal of the desired signal used for the reference signal.

The present invention has been made to solve such a problem, and aims to provide a radar device capable of suppressing unwanted waves in the vicinity of the transmission signal and improving the degree of freedom in the characteristics of distance resolution and range side lobe.

Solution to Problem

A radar device according to the present invention includes: a transmission unit for generating, as a radar wave, the transmission signal obtained by multiplying a linearly FM-modulated pulse signal by a first window function; and a pulse compression unit for performing pulse compression on a received signal, which is a signal obtained by receiving a reflected wave from a target of the radar wave, using a reference signal, in which the pulse compression unit divides a signal, which is obtained by multiplying a first reference signal obtained by multiplying the pulse signal by a second window function different from the first window function, by a complex conjugate part of a second reference signal obtained by multiplying the pulse signal by a third window function, which is a function independent of and different from the second window function, by a complex conjugate part of the transmission signal, and uses a signal of the division result as the reference signal.

Advantageous Effects of Invention

The radar device according to the present invention makes it possible to suppress unwanted waves in the vicinity in the frequency spectrum of the transmission signal by the transmission unit using as the transmission signal a signal obtained by multiplying pulse signals linearly FM-modulated by the first window function, and divides a signal, which is obtained by multiplying a first reference signal obtained by multiplying the pulse signal by a second window function different from the first window function, by a complex conjugate part of a second reference signal obtained by multiplying the pulse signal by a third window function, which is a function independent of and different from the second window function, by a complex conjugate part of the transmission signal, and uses a signal of the division result as the reference signal. This makes it possible to cancel the window function multiplied on the transmission signal and obtain the characteristics of distance resolution and range side lobe from the window function multiplied by any combination of the first reference signal and the second reference signal.

DESCRIPTION OF EMBODIMENTS

In order to explain this invention in more detail, modes for carrying out the present invention will be described below with reference to the accompanying drawings.

First Embodiment

Figure 1:
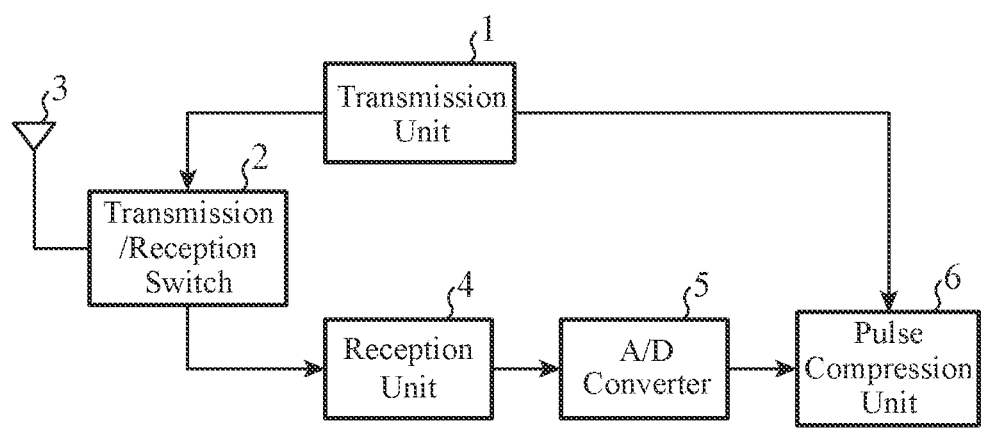
FIG. 1 is a block diagram showing a radar device according to a first embodiment of the present invention.

FIG. 1 is a block diagram of the radar device according to the present embodiment.

Figure 2:
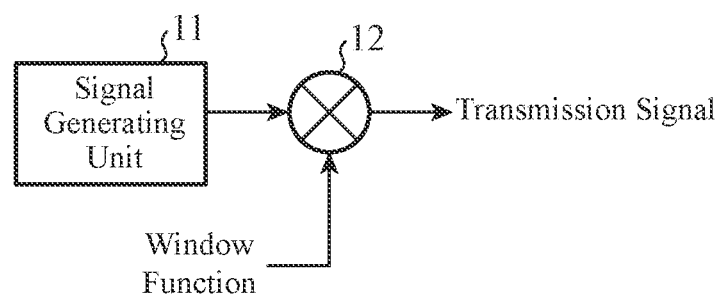
FIG. 2 is a block diagram showing a transmission unit of the radar device according to the first embodiment of the present invention.

The radar device according to the present embodiment includes a transmission unit 1, a transmission/reception switch 2, an antenna 3, a reception unit 4, an A/D converter 5, and a pulse compression unit 6, as shown in FIG. 1. The transmission unit 1 is a processing unit for generating, as a radar wave, a transmission signal obtained by multiplying a linearly FM-modulated pulse signal by a first window function, and the configuration thereof is shown in FIG. 2. As shown in FIG. 2, the transmission unit 1 includes a signal generating unit 11 and a multiplication unit 12. The signal generating unit 11 is a processing unit for generating a linearly FM-modulated pulse signal. The multiplication unit 12 is an operation unit for multiplying the pulse signal generated by the signal generating unit 11 by a first window function set in advance, and outputs the multiplication result as a transmission signal.

Figure 3:
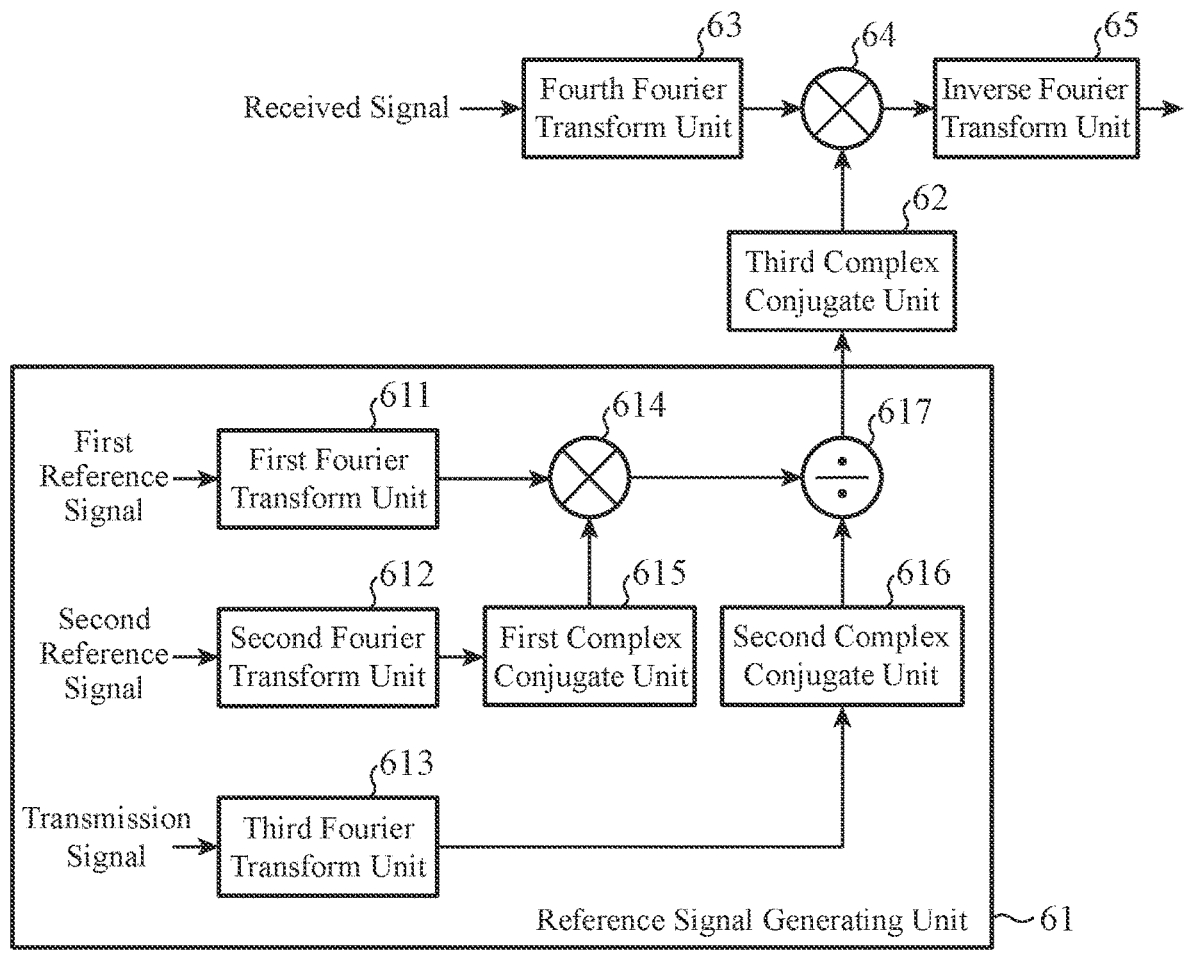
FIG. 3 is a block diagram showing a pulse compression unit of the radar device according to the first embodiment of the present invention.

Returning to FIG. 1, the transmission/reception switch 2 is a switch that supplies the transmission signal from the transmission unit 1 to the antenna 3 and performs switching for transmitting the signal received by the antenna 3 to the reception unit 4. The antenna 3 is an antenna for transmitting and receiving radar waves. The reception unit 4 is a processing unit for receiving the reflected wave from the target received by the antenna 3 via the transmission/reception switch 2. The A/D converter 5 is a converter that converts an analog signal received by the reception unit 4 into a digital signal and outputs the digital signal. As shown in FIG. 3, the pulse compression unit 6 has, as a reference signal generating unit 61, a processing unit that divides a signal, which is obtained by multiplying a first reference signal obtained by multiplying the linearly FM-modulated pulse signal by a second window function different from the first window function, by a complex conjugate part of a second reference signal obtained by multiplying the linearly FM-modulated pulse signal by a third window function different from the second window function, by a complex conjugate part of the transmission signal, and outputs a signal of the division result as a reference signal.

In FIG. 3, the pulse compression unit 6 includes the reference signal generating unit 61, a third complex conjugate unit 62, a fourth Fourier transform unit 63, a second multiplication unit 64, and an inverse Fourier transform unit 65. The reference signal generating unit 61 is a processing unit that generates a reference signal for performing pulse compression, and includes a first Fourier transform unit 611, a second Fourier transform unit 612, a third Fourier transform unit 613, a first multiplication unit 614, a first complex conjugate unit 615, a second complex conjugate unit 616, and a division unit 617.

Into the first Fourier transform unit 611, a first reference signal, which is obtained by multiplying a pulse signal, which has been generated by the signal generating unit 11 and which has been linearly FM-modulated, by a second window function different from the first window function in the transmission signal, is input. The first Fourier transform unit 611 is a processing unit that converts the first reference signal from a time domain signal to a frequency domain signal. Into the second Fourier transform unit 612, a second reference signal, which is obtained by multiplying a pulse signal, which has been generated by the signal generating unit 11 and which has been linearly FM-modulated, by a third window function different from the second window function in the first reference signal, is input. The second Fourier transform unit 612 is a processing unit that converts the second reference signal from a time domain signal to a frequency domain signal. The transmission signal in FIG. 2 is input into the third Fourier transform unit 613. The third Fourier transform unit 613 is a processing unit that converts this transmission signal from a time domain signal to a frequency domain signal. The first multiplication unit 614 is a processing unit that multiplies the output of the first Fourier transform unit 611 and the output of the first complex conjugate unit 615. The first complex conjugate unit 615 is a processing unit that generates a value of the complex conjugate with respect to the output of the second Fourier transform unit 612. The second complex conjugate unit 616 is a processing unit that generates a value of the complex conjugate with respect to the output of the third Fourier transform unit 613. The division unit 617 is a processing unit that divides the output of the first multiplication unit 614 by the value of the second complex conjugate unit 616.

The third complex conjugate unit 62 is a processing unit that generates a value of the complex conjugate with respect to the output of the reference signal generating unit 61. The fourth Fourier transform unit 63 is a processing unit that converts the received signal output from the A/D converter 5 from a time domain signal to a frequency domain signal. The second multiplication unit 64 is a processing unit that multiplies the output of the fourth Fourier transform unit 63 by the output of the third complex conjugate unit 62. The inverse Fourier transform unit 65 is a processing unit that performs a Fourier transform inverse to that of the fourth Fourier transform unit 63 on the output of the second multiplication unit 64 and outputs the result as a pulse compression result.

Next, the hardware configuration of the pulse compression unit 6 will be described.

Figure 4:
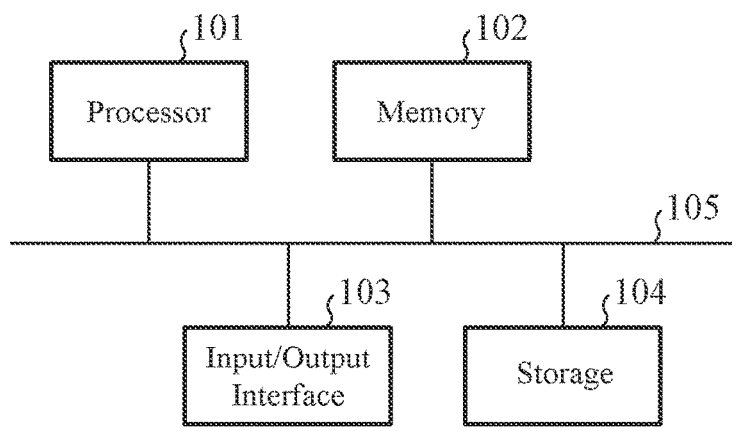
FIG. 4 is a hardware configuration diagram of the pulse compression unit in the radar device according to the first embodiment of the present invention.

FIG. 4 is a hardware configuration diagram of the pulse compression unit 6. As illustrated, the hardware of the pulse compression unit 6 includes a processor 101, a memory 102, an input/output interface 103, a storage 104, and a bus 105. The processor 101 is a processor for realizing the reference signal generating unit 61 to the inverse Fourier transform unit 65 by executing a program corresponding to the functions of the reference signal generating unit 61 to the inverse Fourier transform unit 65. The memory 102 is a storage unit such as a ROM and a RAM used as a program memory for storing various programs, a work memory used when the processor 101 performs data processing, a memory to which signal data is expanded, and the like. The input/output interface 103 is an interface for exchanging data with the outside, for example, an input interface for acquiring the output of the A/D converter 5 and various signals, and an output interface for outputting a signal such as a pulse compression result. The storage 104 is a storage unit for storing programs corresponding to the respective functions of the reference signal generating unit 61 to the inverse Fourier transform unit 65 and for storing various data. The bus 105 is a communication path for connecting the processor 101 to the storage 104 to one another.

The processor 101 may use an arithmetic device such as an FPGA or an ASIC. Further, at least one of the processing units shown in FIG. 3 may be configured by dedicated hardware.

Next, the operation of the radar device according to the first embodiment will be described.

First, in the transmission unit 1, a linearly FM-modulated pulse signal is generated by the signal generating unit 11, and the multiplication unit 12 generates a transmission signal by multiplying the pulse signal by the first window function. As a result, the rising and falling of the time domain of the pulse signal to be transmitted can be multiplied by the window function, and unwanted waves in the vicinity of the frequency spectrum of the transmission signal can be suppressed.

Figure 5A:
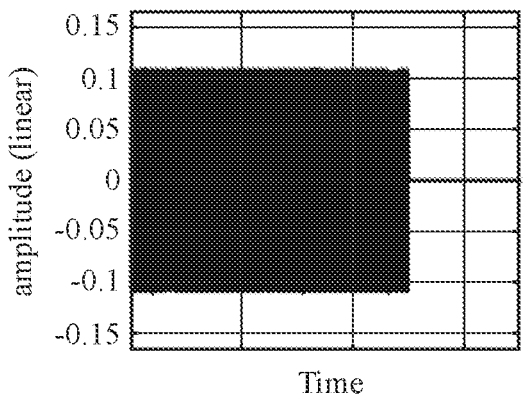
FIG. 5A and FIG. 5B are explanatory diagrams showing waveforms of transmission signals when not multiplied by a window function.
Figure 5B:
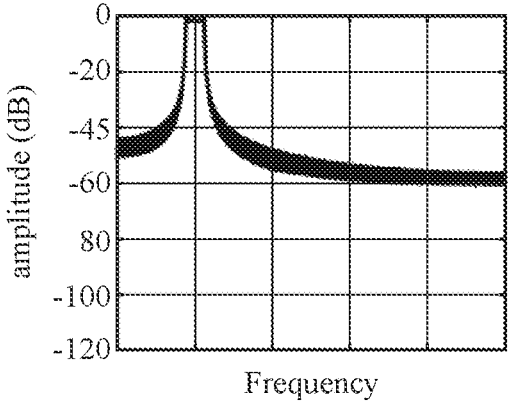
Figure 6A:
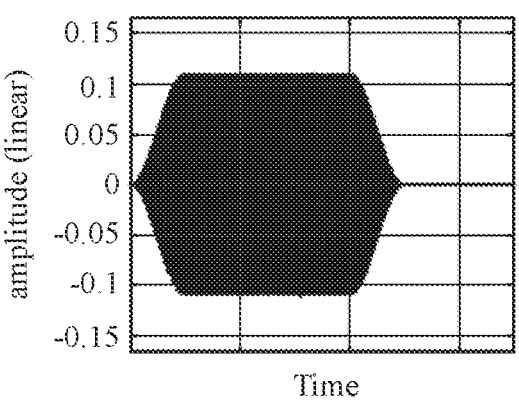
FIG. 6A and FIG. 6B are explanatory diagrams showing waveforms of transmission signals in the radar device according to the first embodiment of the present invention.
Figure 6B:
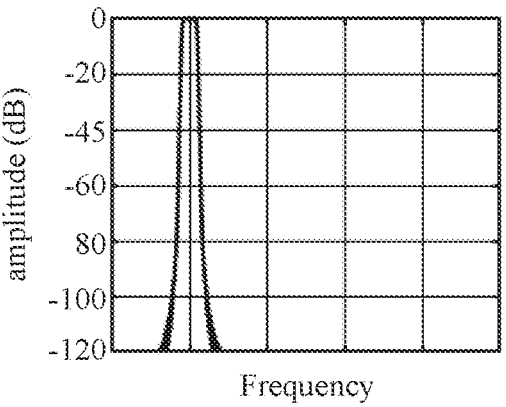

FIG. 5 and FIG. 6 show a case where the window function is not multiplied and a case where the window function is multiplied, respectively. FIG. 5A is a time waveform of the transmission signal in a case where the window function is not multiplied, and FIG. 5B is a frequency spectrum waveform of the transmission signal in a case where the window function is not multiplied. FIG. 6A is a time waveform of a transmission signal in a case where a Tukey (tapered cosine)

window ($\alpha=0.4$) is multiplied as an example of a window function, and FIG. 6B is a frequency spectrum waveform of the transmission signal. As apparent from comparison between FIG. 5B and FIG. 6B, it can be understood that unwanted waves in the vicinity of the transmission signal are suppressed in the frequency spectrum of the transmission signal by multiplying the window function. In addition to the Tukey window, the window function to be multiplied in the multiplication unit 12 can obtain the same effect by using a Hamming window, a Hanning window or the like.

The radar wave generated by the transmission unit 1 is radiated from the antenna 3 into space via the transmission/reception switch 2. The radar wave is reflected by the target, and this is received by the antenna 3 as a reflected wave. The received signal from the antenna 3 is acquired by the reception unit 4 via the transmission/reception switch 2, converted into a digital signal by the A/D converter 5, and output to the pulse compression unit 6.

Figure 7:
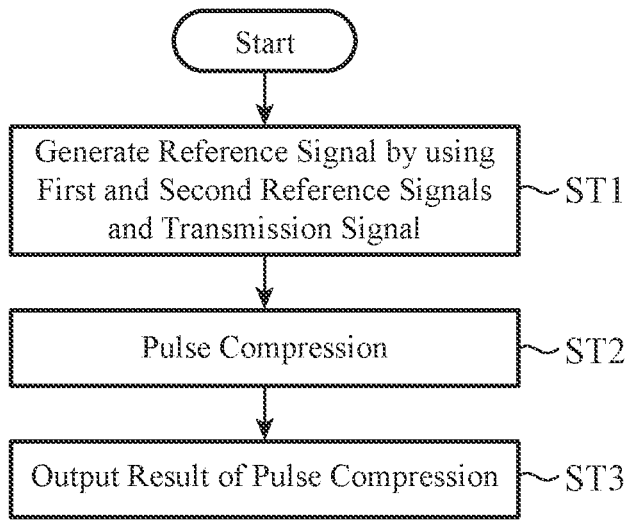
FIG. 7 is a flowchart showing an operation of the pulse compression unit of the radar device according to the first embodiment of the present invention.

FIG. 7 is a flowchart showing the operation of the pulse compression unit 6.

First, the reference signal generating unit 61 generates a reference signal using the first reference signal, the second reference signal, and the transmission signal (step ST1). That is, the first reference signal is Fourier-transformed by the first Fourier transform unit 611, and the second reference signal is Fourier-transformed by the second Fourier transform unit 612. Further, the output of the second Fourier transform unit 612 is output to the first complex conjugate unit 615, and the first complex conjugate unit 615 generates the value of the complex conjugate. The first multiplication unit 614 multiplies the output of the first Fourier transform unit 611 by the output of the first complex conjugate unit 615. On the other hand, the transmission signal is supplied to the third Fourier transform unit 613, the transmission signal is Fourier-transformed, and the second complex conjugate unit 616 obtains the value of the complex conjugate. The value output from the first multiplication unit 614 is divided by the output value of the second complex conjugate unit 616 by the division unit 617, and is output from the reference signal generating unit 61 as a reference signal.

At this time, the reference signal $R_{ref}(f)$ is expressed by the following equation (1).

$$R_{ref}(f) = \{R_{ref1}(f) \times R_{ref2}^*(f)\} \div R_{tx}^*(f) \quad (1)$$

Here, $R_{ref1}(f)$ indicates a signal obtained by Fourier-transforming a first reference signal, $R_{ref2}^*(f)$ indicates a complex conjugate of a signal obtained by Fourier-transforming a second reference signal, and $R_{tx}^*(f)$ indicates the complex conjugate of the signal obtained by Fourier-transforming the transmission signal.

The received signal is input to the fourth Fourier transform unit 63 and converted from the time domain signal to the frequency domain signal. In the second multiplication unit 64, the frequency domain signal is multiplied by the output signal of the third complex conjugate unit 62 (the complex conjugate of the reference signal in the frequency domain generated by the reference signal generating unit 61), then converted from the frequency domain signal to the time domain signal by the inverse Fourier transform unit 65, and thus pulse compression processing is performed (step ST2). The pulse compression processing result Pc is expressed by the following equation (2).

$$Pc = \text{IFFT}\{R_x(f) \times R_{ref}^*(f)\} \quad (2)$$

Here, $R_x(f)$ represents a signal obtained by Fourier-transforming a received signal, and $R_{ref}^*(f)$ represents a complex conjugate of a signal obtained by Fourier-transforming a reference signal. The pulse compression processing result Pc is output as a pulse compression result in the pulse compression unit 6 (step ST3).

In the above example, the third window function is a function different from the second window function, but the third window function may be any function if the third window function is a function independent of the second window function.

As described above, according to the radar device of the first embodiment, since it includes a transmission unit for generating, as a radar wave, a transmission signal obtained by multiplying a linearly FM-modulated pulse signal by the first window function, and a pulse compression unit for performing pulse compression on a received signal, which is a signal that has received the reflected wave from a target of the radar wave, using a reference signal, and the pulse compression unit divides a signal, which is obtained by multiplying a first reference signal obtained by multiplying the pulse signal by a second window function different from the first window function, by a complex conjugate part of a second reference signal obtained by multiplying the pulse signal by a third window function, which is a function independent of the second window function, by a complex conjugate part of the transmission signal, and uses a signal of the division result as the reference signal, the following effects can be obtained.

That is, the unwanted wave in the vicinity of the frequency spectrum of the transmission signal can be suppressed by the window function multiplied by the linearly FM-modulated pulse signal. Also, since the signal obtained by multiplying the first reference signal and the second reference signal is divided by the transmission signal, the window function multiplied by the transmission signal is canceled and the characteristics of distance resolution and range side lobe consisting of window functions multiplied by arbitrary combinations of the first reference signal and the second reference signal can be obtained.

Further, according to the radar device of the first embodiment, since the second window function of the first reference signal and the third window function of the second reference signal are different functions, the degree of freedom in the characteristics of distance resolution and range side lobe can be further improved.

Second Embodiment

Figure 8:
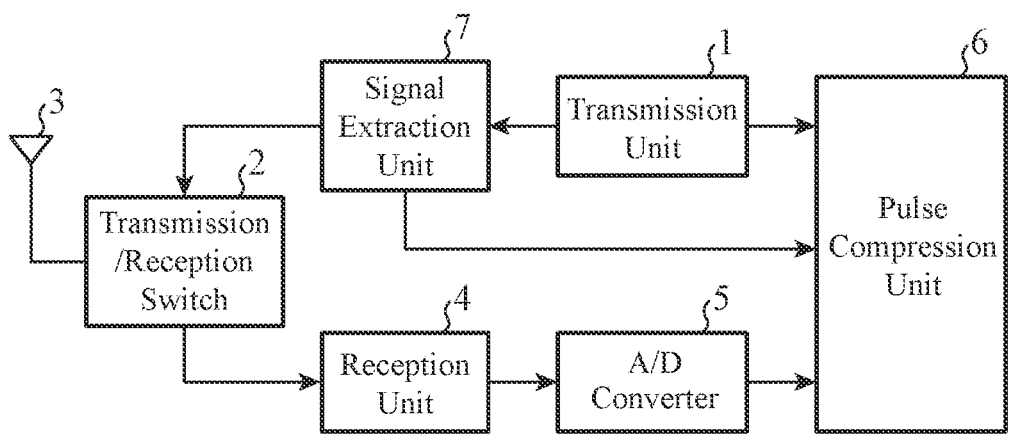
FIG. 8 is a block diagram showing a radar device according to a second embodiment of the present invention.

FIG. 8 is a block diagram of a radar device according to a second embodiment. As illustrated, the radar device according to the second embodiment includes a transmission unit 1, a transmission/reception switch 2, an antenna 3, a reception unit 4, an A/D converter 5, a pulse compression unit 6, and a signal extraction unit 7. The signal extraction unit 7 is a processing unit that extracts the transmission signal transmitted from the transmission unit 1 and outputs the transmission signal to the pulse compression unit 6. The pulse compression unit 6 is configured to generate a reference signal using the transmission signal output from the signal extraction unit 7. The other configuration is the same as the configuration of the first embodiment shown in FIGS. 1 to 4, and thus the description thereof is omitted here.

In the second embodiment, the signal extraction unit 7 extracts the transmission signal output from the transmission unit 1 and outputs the transmission signal to the pulse compression unit 6. The pulse compression unit 6 acquires the transmission signal from the signal extraction unit 7 as a transmission signal to be converted by the third Fourier transform unit 613. The other operations in the pulse compression unit 6 are the same as in the first embodiment, and thus the description thereof is omitted here.

Thereby, even when the transmission signal is distorted by, for example, a high frequency amplifier provided in the transmission unit 1, since a signal obtained by multiplying the first reference signal and the second reference signal is divided by this transmission signal, and thus the reference signal generated from the reference signal generating unit 61 includes a component for canceling the transmission signal, the same effect as that of the first embodiment can be obtained.

Note that, the signal extraction unit 7 may extract a part of the transmission signal as in the directional coupler, or may switch paths along time, like a switch and extract the transmission signal.

As described above, according to the radar device of the second embodiment, the signal extraction unit for extracting the transmission signal is provided, and the pulse compression unit generates the reference signal using the transmission signal extracted by the signal extraction unit. Therefore, even when the transmission signal is distorted, for example, the same effect as that of the first embodiment can be obtained.

Third Embodiment

Figure 9:
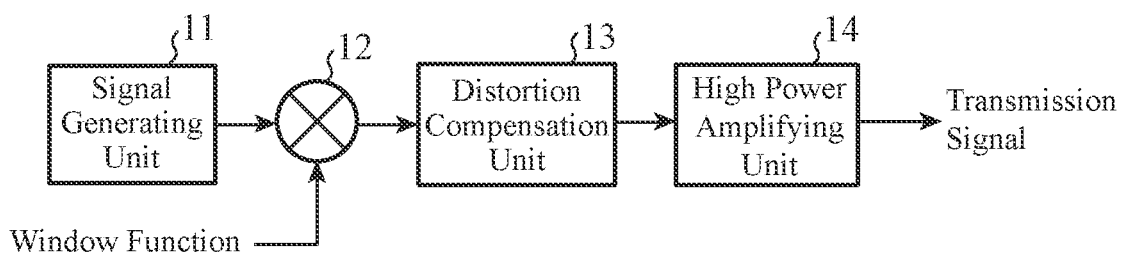
FIG. 9 is a block diagram showing a transmission unit in a radar device according to a third embodiment of the present invention.

FIG. 9 is a block diagram showing the transmission unit 1 in the radar device of the third embodiment. The configuration of the radar device other than the transmission unit 1 is the same as that of the first embodiment or the second embodiment, and thus the description thereof is omitted here.

The transmission unit 1 illustrated in FIG. 9 includes a signal generating unit 11, a multiplication unit 12, a distortion compensation unit 13, and a high power amplifying unit 14. The distortion compensation unit 13 generates a signal in which distortion generated in the high power amplifying unit 14 is compensated in advance. The high power amplifying unit 14 amplifies the output signal of the distortion compensation unit 13 and outputs it as a transmission signal.

As a result, the high power amplifying unit 14 outputs a transmission signal without distortion, and the reference signal generated from the reference signal generating unit 61 includes a component that cancels the transmission signal, and thus the same effect as that of the first embodiment can be obtained.

As described above, according to the radar device of the third embodiment, the transmission unit includes the amplification unit for amplifying the transmission signal, and the distortion compensation unit for canceling the distortion generated in the amplification unit. Since a signal whose distortion is canceled in the distortion compensation unit is generated as the transmission signal, a signal without distortion can be obtained as the transmission signal, and the same effect as that of the first embodiment can be obtained even when distortion is generated in the amplification unit of the transmission unit.

It should be noted that the invention of the present application can freely combine the respective embodiments, modify an arbitrary constituent element of each embodiment, or omit an arbitrary constituent element in each embodiment within the scope of the invention.

INDUSTRIAL APPLICABILITY

As described above, the radar device according to the present invention relates to a configuration in which a signal generated using a transmission signal that is linearly FM-modulated is used as a reference signal to obtain a correlation between the received signal and the reference signal and is suitable for use in a radar device that uses a pulse-like signal as a radar wave.

REFERENCE SIGNS LIST

1: Transmission unit, 2: Transmission/reception switch, 3: Antenna, 4: Reception unit, 5: A/D converter, 6: Pulse compression unit, 7: Signal extraction unit, 11: Signal generating unit, 12: Multiplication unit, 13: Distortion compensation unit, 14: High power amplifying unit, 61: Reference signal generating unit, 62: Third complex conjugate unit, 63: Fourth Fourier transform unit, 64: Second multiplication unit, 65: Inverse Fourier transform unit, 611: First Fourier transform unit, 612: Second Fourier transform unit, 613: Third Fourier transform unit, 614: First multiplication unit, 615: First complex conjugate unit, 616: Second complex conjugate unit, 617: Division unit.

The invention claimed is:

1. A radar device comprising:
processing circuitry performing a process to:
    generate, as a radar wave, a transmission signal obtained by multiplying a linearly FM-modulated pulse signal by a first window function; and
    perform pulse compression on a received signal, which is a signal obtained by receiving a reflected wave from a target of the radar wave, using a reference signal, wherein
the process divides a signal by a complex conjugate part of the transmission signal and uses a signal of the division result as the reference signal,
wherein the signal is obtained by multiplying a first reference signal by a complex conjugate part of a second reference signal,
wherein the first reference signal is obtained by multiplying the pulse signal by a second window function which is different from the first window function,
wherein the second reference signal is obtained by multiplying the pulse signal by a third window function, which is a function independent of and different from the second window function.

2. The radar device according to claim 1, the process further comprising extracting the transmission signal, wherein the process generates the reference signal using the transmission signal extracted.

3. The radar device according to claim 1, wherein the process includes amplifying the transmission signal and cancelling distortion generated in the amplification process.

* * * * *